(12) United States Patent
Dhotre et al.

(10) Patent No.: US 10,547,164 B2
(45) Date of Patent: Jan. 28, 2020

(54) CONNECTORS AND METHODS FOR MAKING AND USING THE SAME

(71) Applicant: Sigma Electric Manufacturing Corporation, Garner, NC (US)

(72) Inventors: Anand Chandrakant Dhotre, Pune (IN); Vinayak Manohar Chavan, Pune (IN); Ashok Alilughatta Sathyanarayana, Pune (IN)

(73) Assignee: SIGMA ELECTRIC MANUFACTURING CORPORATION, Garner, NC (US)

( * ) Notice: Subject to any disclaimer, the term of this patent is extended or adjusted under 35 U.S.C. 154(b) by 998 days.

(21) Appl. No.: 14/701,669

(22) Filed: May 1, 2015

(65) Prior Publication Data
US 2015/0316189 A1    Nov. 5, 2015

Related U.S. Application Data

(60) Provisional application No. 61/988,124, filed on May 2, 2014.

(51) Int. Cl.
| | |
|---|---|
| F16L 15/04 | (2006.01) |
| H02G 3/06 | (2006.01) |
| F16L 37/23 | (2006.01) |
| F16L 21/00 | (2006.01) |
| F16L 25/00 | (2006.01) |

(52) U.S. Cl.
CPC ............ H02G 3/0658 (2013.01); F16L 15/04 (2013.01); F16L 21/007 (2013.01); F16L 25/009 (2013.01); F16L 37/23 (2013.01)

(58) Field of Classification Search
CPC ......... F16L 37/23; F16L 25/009; F16L 15/04; F16L 21/007; H02G 3/0658
See application file for complete search history.

(56) References Cited

U.S. PATENT DOCUMENTS

| | | | |
|---|---|---|---|
| 6,076,235 A | 6/2000 | Khokhar | |
| 6,765,143 B2 | 7/2004 | Kiely | |
| 6,791,031 B1 | 9/2004 | Manning | |
| 6,916,988 B1 | 7/2005 | Auray et al. | |
| 7,057,107 B2 | 6/2006 | Auray et al. | |
| 7,064,272 B2 | 6/2006 | Auray et al. | |
| 7,075,007 B2 | 7/2006 | Auray et al. | |

(Continued)

FOREIGN PATENT DOCUMENTS

WO    WO-0229301 A1 *  4/2002  ............ F16L 37/092

*Primary Examiner* — David Bochna
*Assistant Examiner* — James A Linford
(74) *Attorney, Agent, or Firm* — Cantor Colburn LLP

(57) ABSTRACT

A connector comprises: a connector body comprising an inlet end and an outlet end with a bore extending therethrough, the connector body further comprising a leading end portion positioned at the inlet end and a threaded portion at the outlet end of the connector body and a connector main body portion positioned between the leading end portion and the threaded portion; a generally annular bearing case having a tapered surface positioned in the leading end portion of the connector body, the bearing case formed with at least one recess and wherein the tapered surface has a hollow portion therein and includes a bearing case axis; and at least one locking element positioned in the at least one recess of the bearing case and movable along the bearing case axis.

9 Claims, 15 Drawing Sheets

(56) References Cited

U.S. PATENT DOCUMENTS

| | | | |
|---|---|---|---|
| 7,151,223 B2 | 12/2006 | Auray et al. | |
| 7,154,042 B2 | 12/2006 | Auray et al. | |
| 7,205,489 B2 | 4/2007 | Auray et al. | |
| 7,302,737 B2 | 12/2007 | Bae | |
| 7,488,905 B2 | 2/2009 | Kiely et al. | |
| 7,645,947 B2 | 1/2010 | Kiely et al. | |
| 7,841,630 B1 * | 11/2010 | Auray | F16L 5/06 285/151.1 |
| 7,930,805 B2 | 4/2011 | Bulanda | |
| 8,274,000 B2 | 9/2012 | Smith | |
| 8,474,877 B2 | 7/2013 | Smith | |
| 8,485,062 B2 | 7/2013 | Chiou | |
| 8,490,513 B2 | 7/2013 | Chiou | |
| 8,701,520 B2 | 4/2014 | Chiou | |

* cited by examiner

CONNECTORS AND METHODS FOR MAKING AND USING THE SAME

CROSS REFERENCE TO RELATED APPLICATION

This application claims the benefit of U.S. Provisional Application No. 61/988,124, filed on May 2, 2014, the contents of which are incorporated herein.

TECHNICAL FIELD

The instant application relates to electrical metallic tubing connectors that can be easily installed in a junction box and that can be easily removed from a junction box as well as dual-sided connectors that connect two different conduits or electrical metallic tubings to one another.

BACKGROUND

Electrical metallic tubing (EMT) is generally connected to electrical boxes (i.e., junction boxes) by a tubular fitting including a threaded end with a threaded nose for insertion into a circular aperture in a box and a leading end including a screw mounted laterally through the fitting wall for securing the electrical metallic tubing to the fitting. This arrangement, although providing satisfactory tubing retention and sufficient electrical continuity between the electrical metallic tubing to the electrical box, junction, and various electrical housings to satisfy electrical code requirements, is time consuming and labor intensive. For every connection, an installer must first stab the threaded end of the fitting into the box and thread a lock nut onto the threaded nose to secure the fitting to the box and, secondly, secure the electrical metallic tubing to the leading end of the fitting by tightening the laterally mounted screw through the fitting wall. For any given installation of electrical metallic tubing in a building or factory, there can be hundreds or even thousands of such connections needed to completely wire the building. Additionally, tools must typically be used to achieve a secure connection, including a wrench on the lock nut and a screwdriver on the laterally mounted screw. Therefore, it should be appreciated that completing all of these connections can be very time consuming, requiring at least two different tools in order to complete each connection. Furthermore, when removing or replacing electrical metallic tubing connectors, an equal amount of time is needed to remove and tool(s) are often required to complete removal.

Electrical metallic tubing is generally held in place once in the junction box with tangs extending from a retaining ring as part of the tubular fitting. The tangs dig into the outer surface of the electrical metallic tubing. While this serves to hold the tubing in place, if a change or modification is required, such that the tubing needs to be removed from the connector and/or junction box, it often cannot be completed without cutting the tubing or completely disassembling the fitting. Such a process can be difficult and time consuming and can make any subsequent modifications to the configuration of the tubing difficult.

Thus, an electrical metallic tubing connector that can easily be installed and/or removed from a junction box is therefore desirable.

BRIEF DESCRIPTION

Disclosed herein are electrical metallic tubing connectors and methods for making and using the electrical metallic tubing connectors.

A connector comprises: a connector body comprising an inlet end and an outlet end with a bore extending therethrough, the connector body further comprising a leading end portion positioned at the inlet end and a threaded portion at the outlet end of the connector body and a connector main body portion positioned between the leading end portion and the threaded portion; a generally annular bearing case having a tapered surface positioned in the leading end portion of the connector body, the bearing case formed with at least one recess and includes a bearing case axis; and at least one locking element positioned in the at least one recess of the bearing case and movable along the bearing case axis.

A dual-sided connector comprises: a connector body comprising a first dual connector body portion having a first inlet end and a first leading edge portion and a second dual connector body portion having a second inlet end and a second leading edge portion, wherein the connector body further comprises a bore extending therethrough; a first generally annular bearing case having a first tapered surface positioned in the first leading end portion of the connector body, the first bearing case formed with at least one recess and includes a first bearing case axis; a second generally annular bearing case having a second tapered surface positioned in the second leading end portion of the connector body, the second bearing case formed with at least one recess and wherein the second tapered surface has a hollow portion therein and includes a second bearing case axis; at least one first locking element positioned in the at least one recess of the first bearing case and movable along the first bearing case axis; and at least one second locking element positioned in the at least one recess of the second bearing case and movable along the second bearing case axis.

A method of making a connector comprises: forming a connector body comprising an inlet end and an outlet end with a bore extending therethrough, the connector body further comprising a leading end portion positioned at the inlet end and a threaded portion at the outlet end of the connector body and a connector main body portion positioned between the leading end portion and the threaded portion; providing a generally annular bearing case having a tapered surface and formed with at least one recess formed therein and includes a bearing case axis; inserting at least one locking element in the at least one recess of the bearing case and movable along the bearing case axis; and inserting the generally annular bearing case having a tapered surface into the leading end portion of the connector body.

These and other features of the electrical metallic tubing connector and methods of making will be understood from the drawings and description below.

BRIEF DESCRIPTION OF THE DRAWINGS

Refer now to the figures, which are exemplary embodiments, and wherein the like elements are numbered alike, and are not necessarily re-described in relation to each figure.

DETAILED DESCRIPTION

Figure 1:
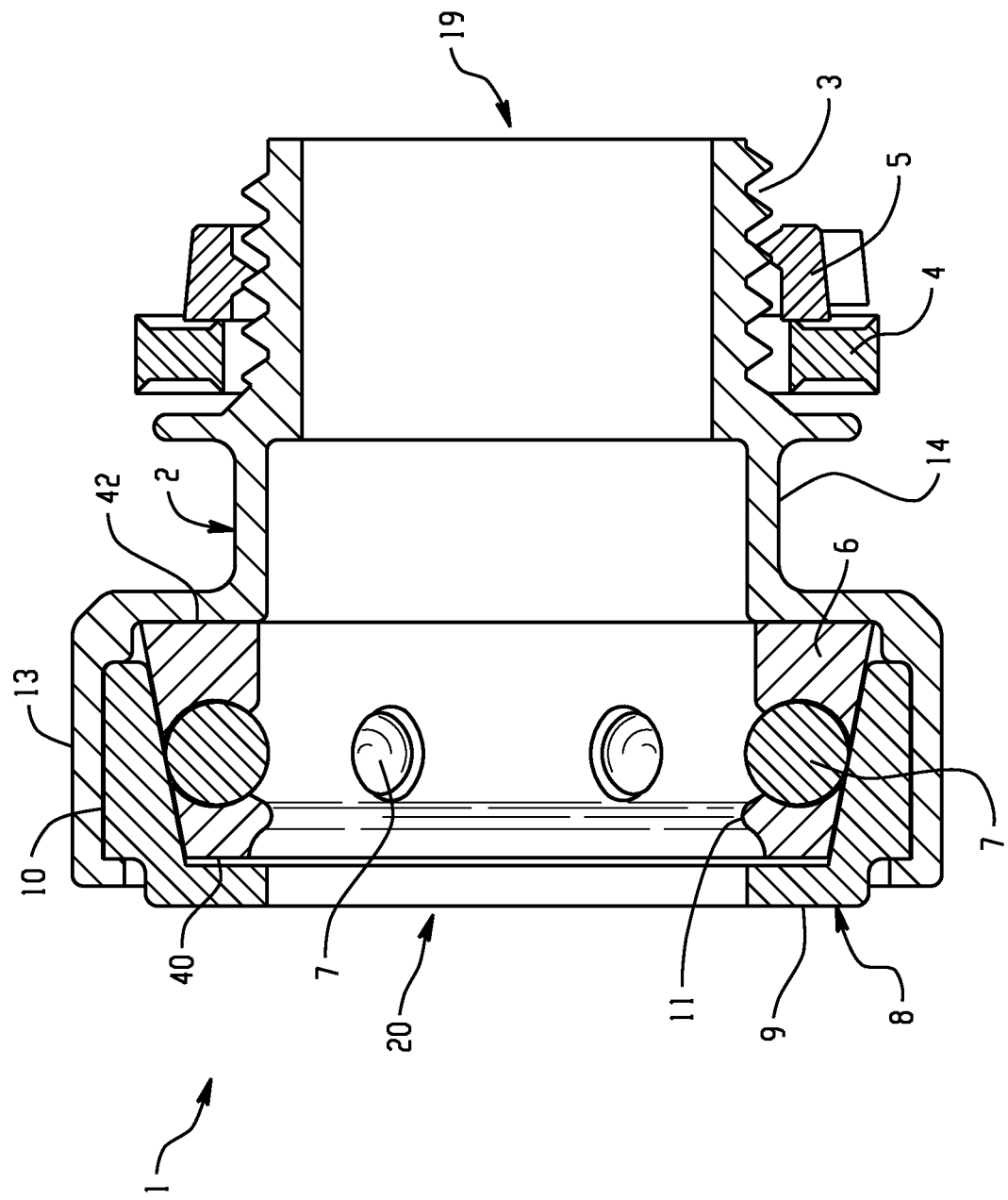
FIG. 1 is a cross sectional view illustration of an assembled connector.
Figure 2:
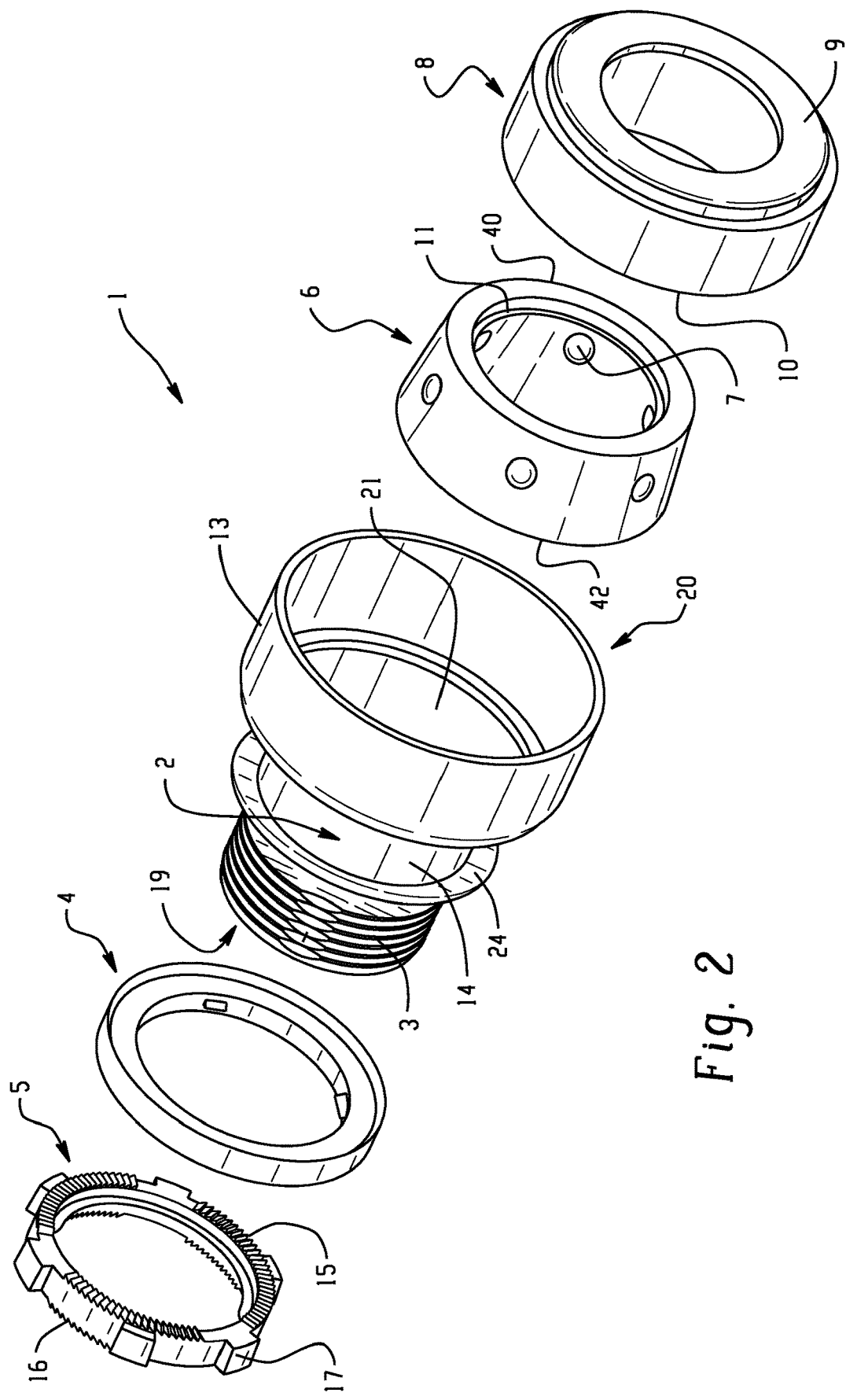
FIG. 2 is an exploded isometric view of a connector.
Figure 3:
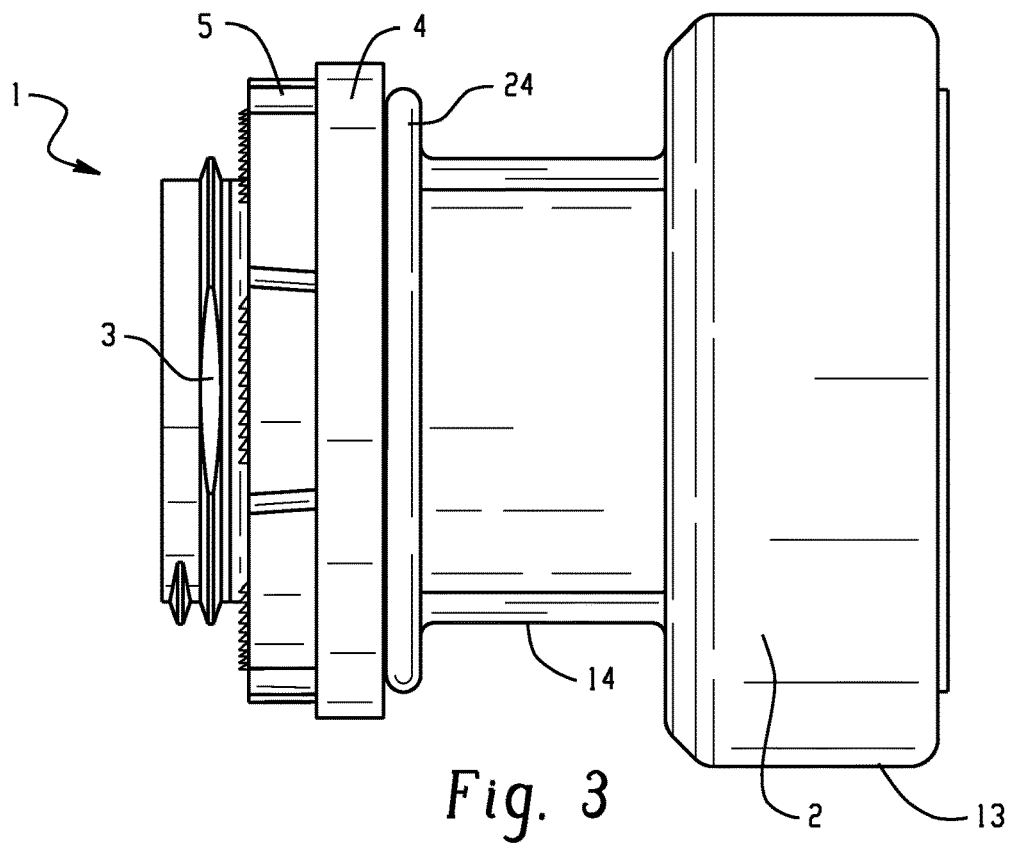
FIG. 3 is a side illustration of the connector of FIG. 1.
Figure 4:
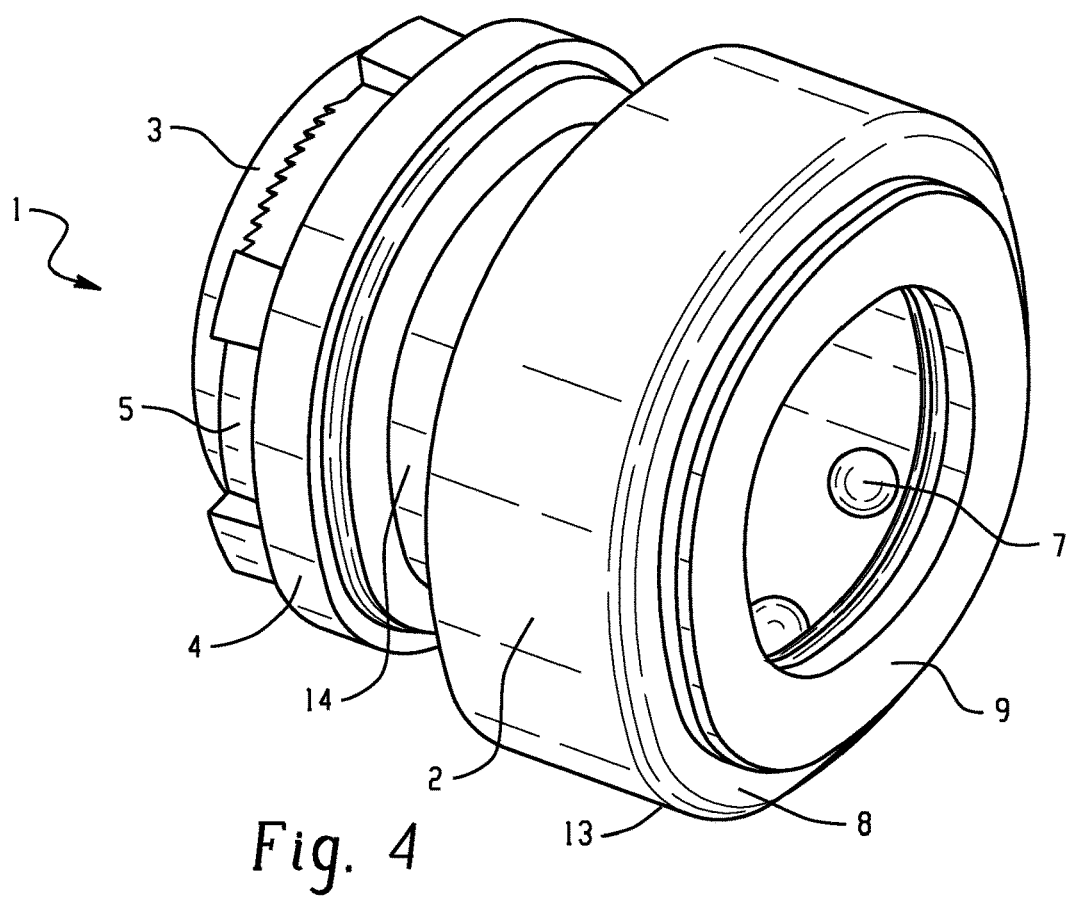
FIG. 4 is an isometric illustration of the assembled connector of FIG. 1.

Disclosed herein are electrical metallic tubing connectors (also referred to herein as electrical metallic tubing snap-lock connectors, snap-lock electrical connectors, or connectors) that allow electrical metallic tubing to be easily and quickly assembled to and removed from a connector and/or a junction box. For example, the electrical metallic tubing connectors disclosed herein can allow installation and removal of the electrical metallic tubing from a connector without an additional tool. The electrical metallic tubing connector can thus be attached to a junction box with or without the use of an additional tool. The electrical metallic tubing connectors (also referred to herein as "the connector") disclosed herein can allow insertion of electrical metallic tubing (e.g., pipes) into a connector body, for example, with a pushing motion or force from the user's hand to glide the electrical metallic tubing into the connector. The connectors can have an inlet end in which electrical metallic tubing can be inserted and an outlet end such that the connector can be attached to an electrical box. The connector body can comprise a unitary connector body, meaning that the connector body is a single piece component (e.g., a die cast component).

A ball locking element, such as a steel ball locking element can be inserted in a recess in a generally annular-shaped bearing case. For example, at least one ball locking element can be inserted in at least one corresponding recess in a generally annular-shaped bearing case, for example, greater than or equal to one ball locking element can be inserted, for example, multiple ball locking elements can be inserted into corresponding recesses on the bearing case. If multiple (i.e., greater than one) ball locking elements are used, the ball locking elements can be inserted in corresponding recesses in a generally annular-shaped bearing case such that the ball locking elements can be spaced around the circumference of the bearing case. The ball locking elements can be optionally equally spaced around the circumference of the bearing case. The bearing case can then be inserted into the connector body in such a manner as to be engaged therewith. The at least one or multiple of ball locking elements can be configured to roll or move along an axis in a tapered surface of the bearing case that can function as a sealing device for the ball locking element. The bearing case can be a compressible member formed for example, from plastic material, e.g., thermoplastics, thermoplastic elastomers, rubber, or a rubber-like material to act as a ball locking element housing, spring, and sealing device for the steel ball locking elements. When tubing or a conduit is inserted into the connector body, the compression member can compress and secure the steel ball locking element in place. This action can occur in several places around the circumference of the bearing case wherever the steel ball locking elements can be inserted into the recesses thereof and assembled with the connector body. As a result, the tubing inserted in the connector body can be thus engaged and secured in the connector body. To remove the tubing, a sufficient rotational force can be applied opposite to the direction of insertion, thereby alleviating the need for any tools for installation or removal. Following removal, the electrical metallic tubing and/or connector can then be reused if desired.

The connector body can have a threaded end (i.e., outlet end or junction box end) for engagement with an electric box or panel and can have an inlet end allowing insertion of electrical metallic tubing therein. The connector body can also comprise a dual-sided (often referred to as a "coupling") electrical metallic tubing connector such that the connector acts to connect two different conduits or electrical metallic tubings to one another. For example, a dual-sided electrical metallic tubing connector can couple two electrical metallic tubings together so that an inlet end is present on either end of the connector.

The various components of the connector can comprise any material that can provide the desired structural integrity and protection to the internal components of the connector. For example, the connector body, can comprise the same or different materials, wherein the materials can comprise a metal (e.g., a metal die cast part) such as zinc (e.g., a zinc die cast part), aluminum (e.g., aluminum die cast part), or steel (e.g., a zinc die cast part), plastic materials, including thermoplastic and thermoset materials, or combinations comprising at least one of the foregoing. The connector body can also comprise a single piece die cast part.

Referring now to the figures, which are exemplary and not intended to limit the scope hereof A more complete understanding of the components, processes, and apparatuses disclosed herein can be obtained by reference to the accompanying drawings. These figures (also referred to herein as "FIG(S)., FIGURE(S)") are merely schematic representations based on convenience and the ease of demonstrating the present disclosure, and are, therefore, not intended to indicate relative size and dimensions of the devices or components thereof and/or to define or limit the scope of the exemplary embodiments. Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

Referring to FIGS. 1 to 11, various views of an electrical metallic tubing connector 1 (also referred to herein as "the connector") for attaching a conduit or electrical metallic tubing to an electric box or panel are shown. Connector 1 can comprise a connector body 2 having a generally cylindrical shape that can allow insertion of electrical metallic tubing therein. As shown for example in FIGS. 1-6 and 9, connector body 2 can comprise connector body main portion 14, threaded portion 3, and leading end portion 13. Connector main body portion 14 can also comprise shoulder 24 proximate to threaded portion 3. Thus, connector body main portion 14 can terminate at shoulder 24. Shoulder 24 can for example be round or hexagonal in shape.

Connector 1 can further include inlet end 20 proximate to leading end portion 13 and outlet end 19 proximate to threaded portion 3. Connector 1 can further include bore 21 extending from inlet end 20 to outlet end 19.

Figure 5:
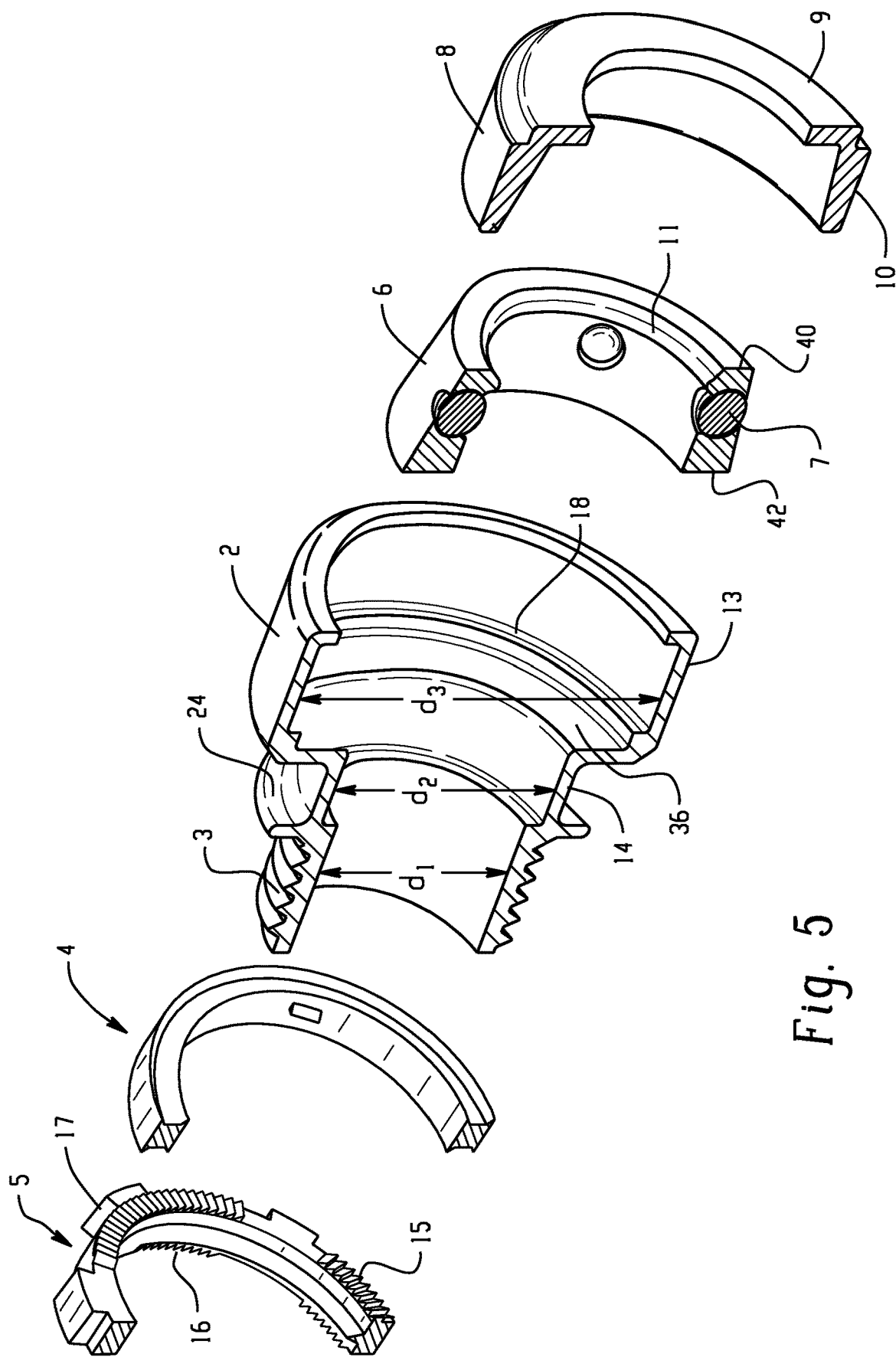
FIG. 5 is an exploded cross-sectional view of the connector of FIG. 2.
Figure 22:
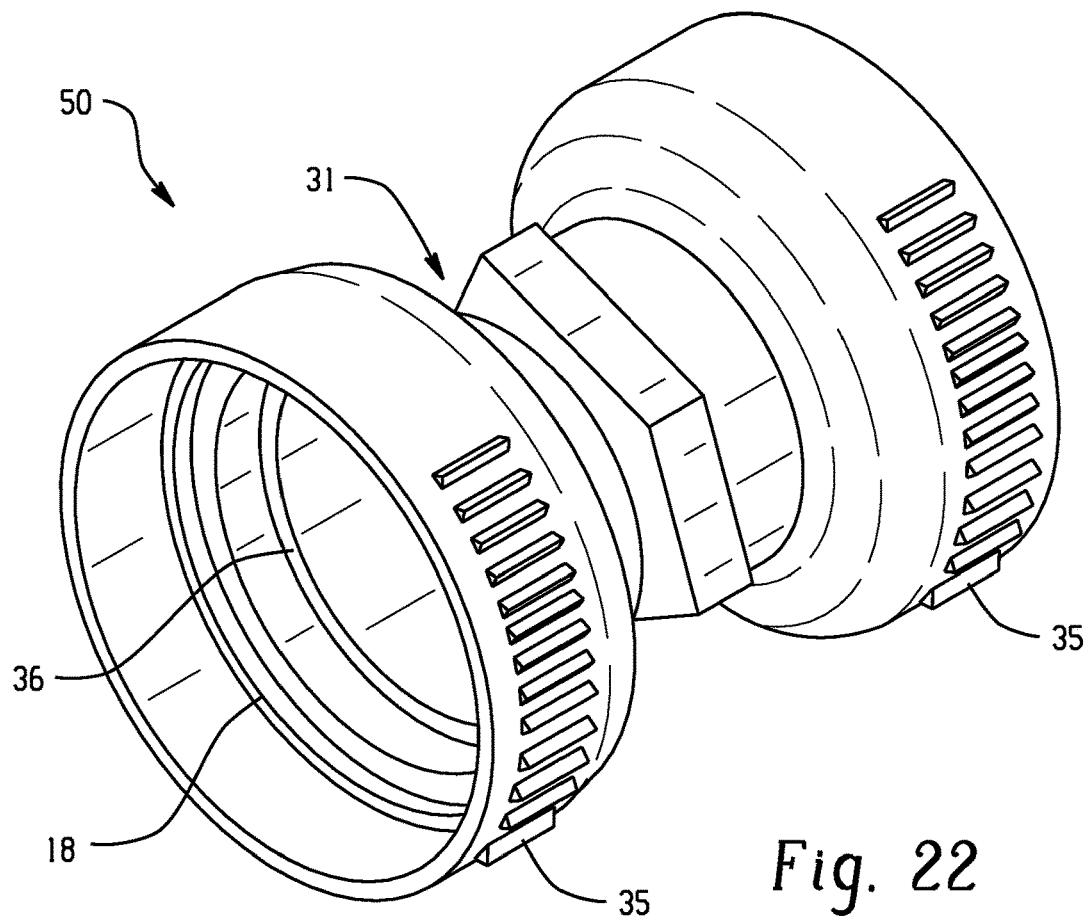
FIG. 22 illustrates another view of the dual-sided connector of FIG. 21.

As seen in FIG. 5 for example, threaded portion 3 can have an inner diameter $d_1$ while connector body main portion 14 can have an inner diameter $d_2$, and leading end portion can have an inner diameter $d_3$. It will be appreciated that the diameters $d_1$, $d_2$ and $d_3$ can vary depending on the intended tubing to be used. As can be seen from FIG. 5, however, $d_1$ can generally be of a smaller diameter than $d_2$ and $d_2$ can generally be of a smaller diameter than $d_3$. The difference in size of $d_2$ and $d_3$ can be configured such that when bearing case 6 is inserted into connector body 2, second end portion 42 of bearing case 6 can engage inner shoulder 18 of leading end portion 13 so as to form a bore having a diameter similar to or the same as $d_2$. In this manner, when connector 1 is assembled with bearing case 6, a substantially flush or straight portion can be formed in bore 21 as can be seen for example in FIG. 9. In addition and as can be seen for example in FIGS. 5 and 22, entry chamfer 36 can facilitate the insertion of entry of the conduit or tubing. Leading end portion 13 can thus terminate at inner shoulder 18 as can be seen for example in FIGS. 2 and 5. Thus, when tubing 22 (such as electrical metal tubing or EMT) is inserted into connector body 14 when connector 1 is assembled, tubing 22 can be pushed into bore 21 until tubing 22 contacts shoulder 24. Shoulder 24 can thus be designed to act as a stop as to the length tubing 22 can be inserted into connector 1.

Figures 10, 11:
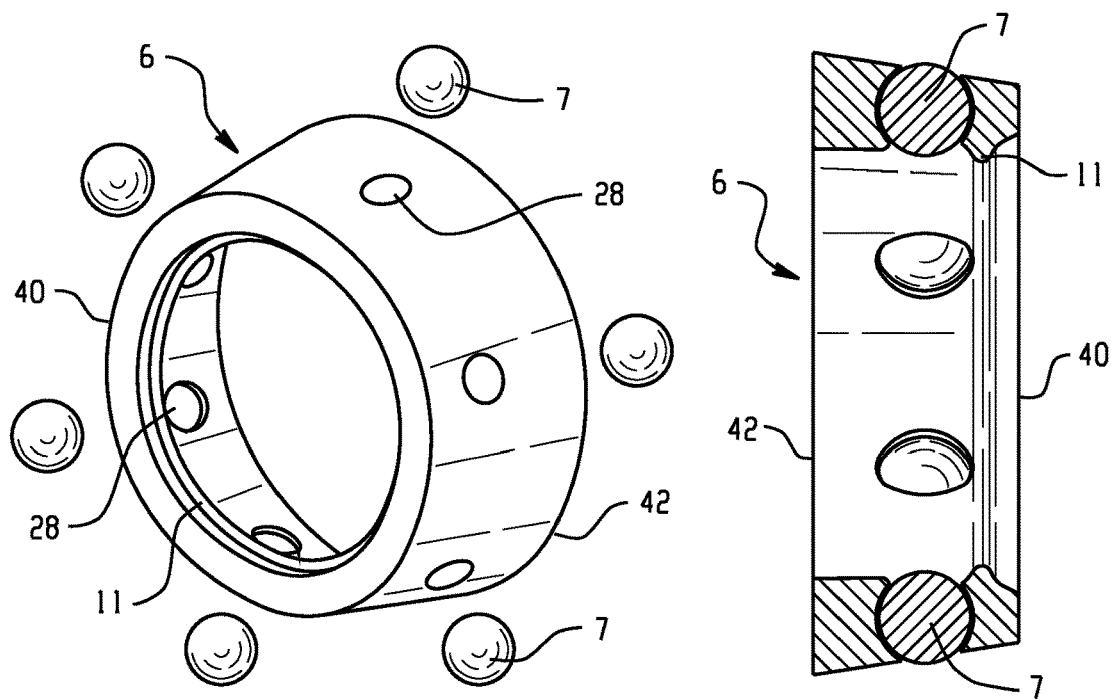
FIG. 10 is an exploded view of a bearing case and steel ball locking elements used in a connector body.
FIG. 11 is a side view of the bearing case and steel ball locking elements of FIG. 10.
Figure 12:
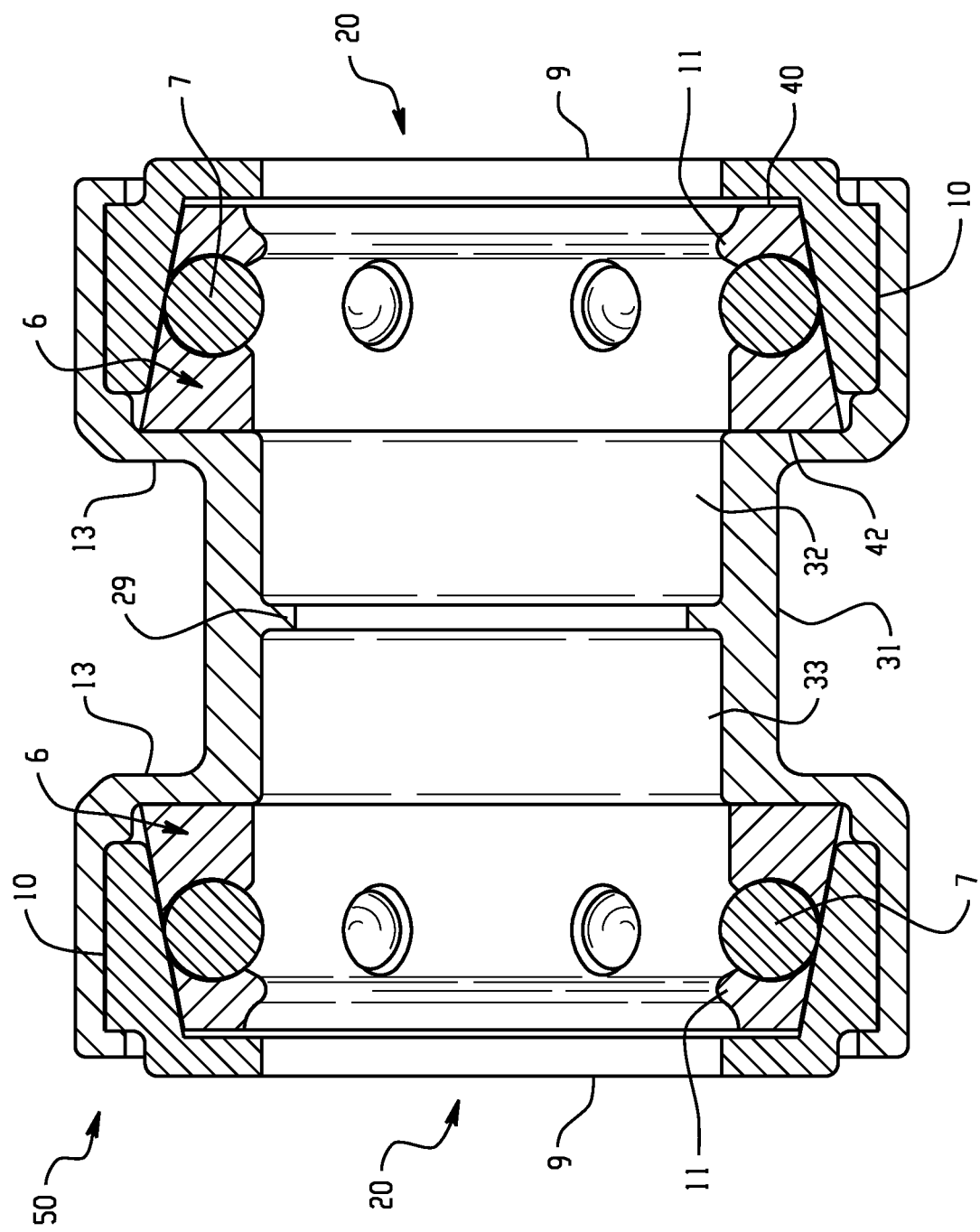
FIG. 12 is an illustration of an assembled dual-sided connector.
Figure 13:
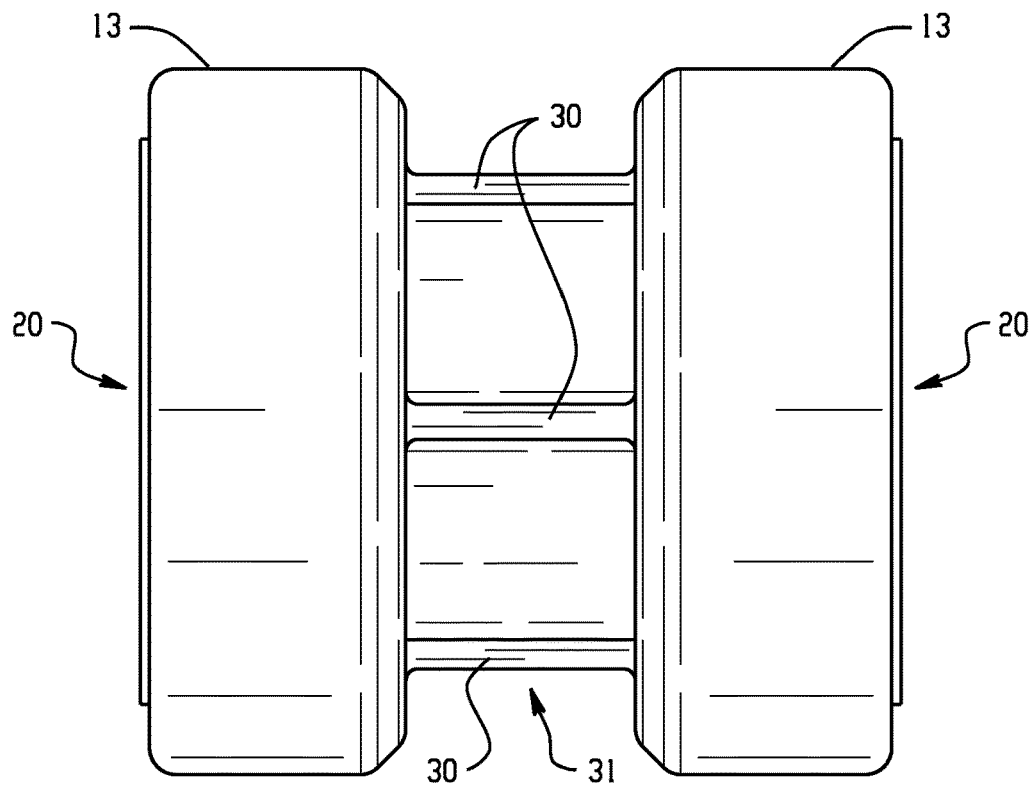
FIG. 13 is a side view of the assembled dual-sided connector of FIG. 12.
Figure 14:
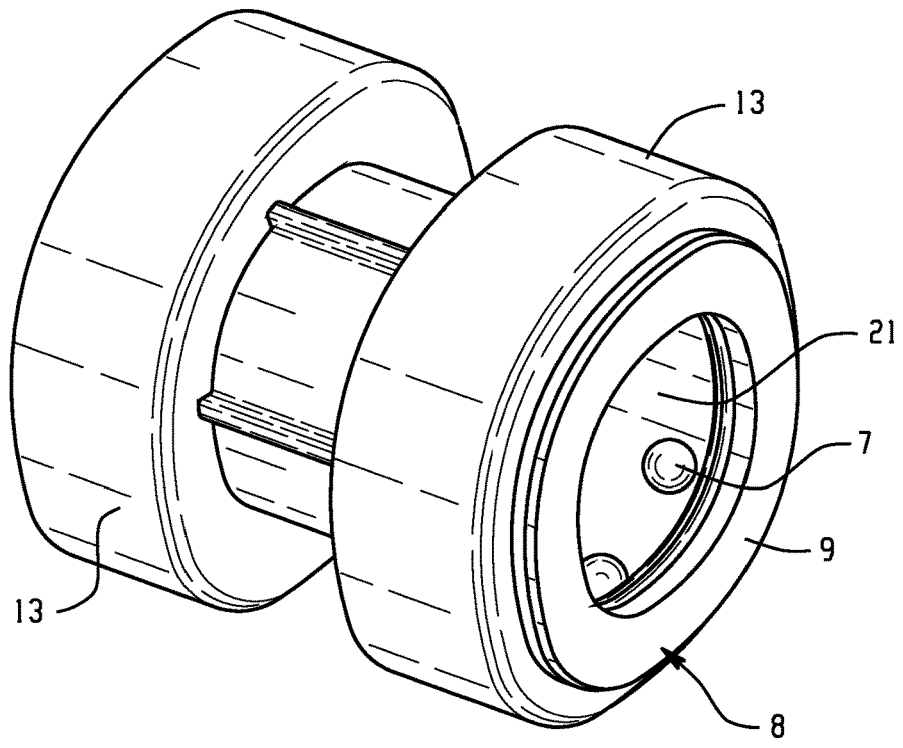
FIG. 14 is an isometric view of the assembled dual-sided connector of FIG. 12.
Figure 15:
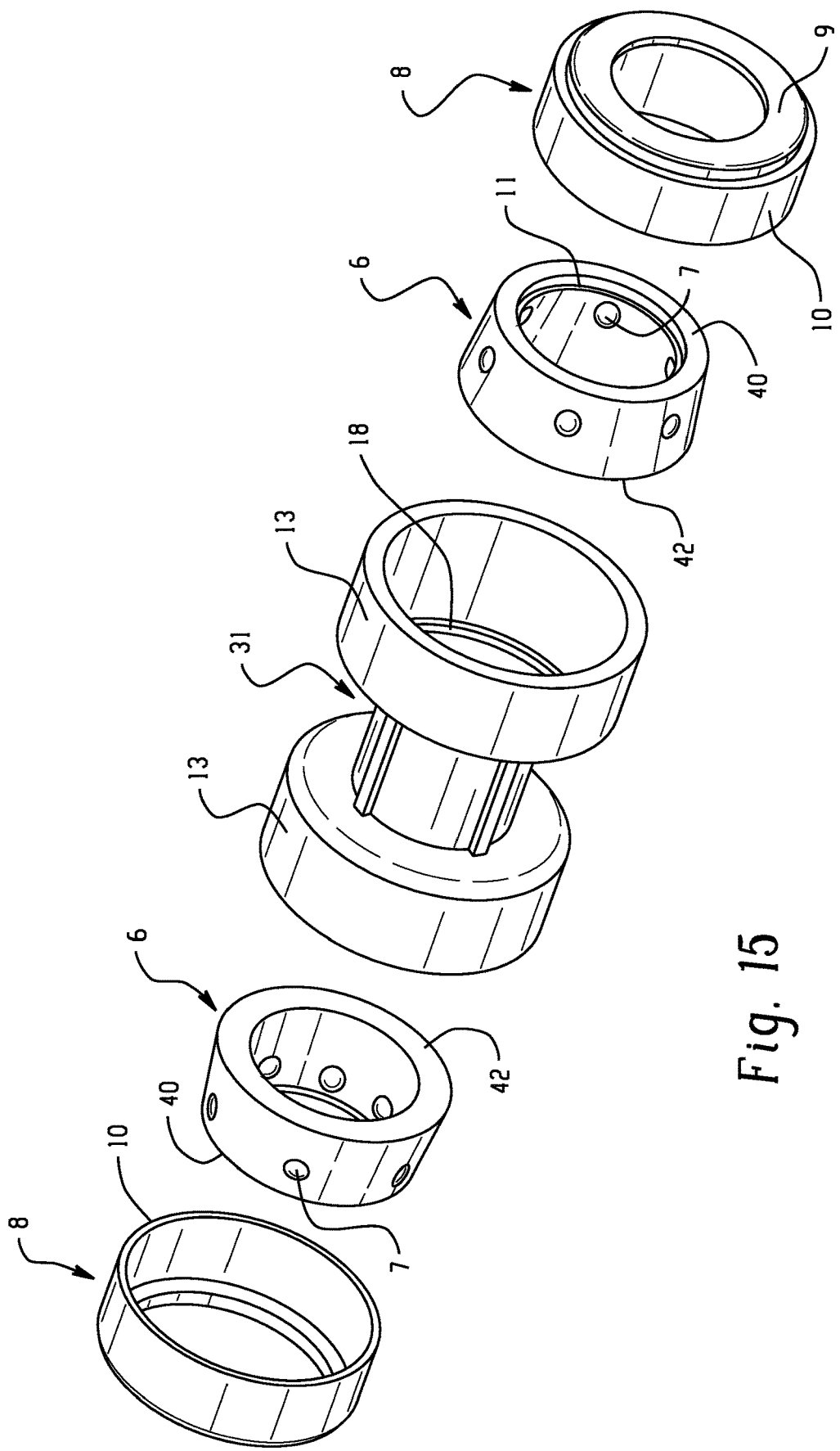
FIG. 15 is an exploded view of a dual-sided connector.

As shown in FIGS. 1-11 and more particularly for example at FIGS. 10 and 11, bearing case 6 can generally comprise an annular-shaped member having a first end portion 40 and a second end portion 42 wherein the bearing case can be formed of a rubber or rubber-like material so as to be compressible. As can be seen for example in FIGS. 7, 8 and 10, bearing case 6 can comprise a smaller diameter at first end 40 and extending towards second end 42 having a larger diameter to provide a tapered surface 27 and can optionally form a hollow portion or recess 23. Bearing case 6 can also include lip 11 and a multiple of recesses or apertures 28 for receiving steel ball locking elements 7. Ball locking elements 7 can be formed of steel or the like. It will be appreciated that other materials can be used to construct ball locking elements 7 so long as the material(s) is of sufficient strength to engage and secure tubing 22 when connector 1 is in use. As can further be seen from the figures, tapered surface 27 of bearing case 6 can provide axis 26 along which ball locking elements 7 can roll. Bearing case 6 thus can be a compressible member that provides for a steel ball locking element housing, spring, and sealing device.

As seen from FIGS. 1-9, connector 1 can further include annular cap 8. Cap 8 can include raised annular portion 9 and annular recessed portion 10. When assembled, annular recessed portion 10 can be positioned proximate to bearing case 6. More specifically, annular cap 8 can be positioned proximate to the inlet end 20 of leading edge portion 13 of the connector body 14, wherein the annular cap 8 can include a raised portion 9 and a recessed portion 10 with the recessed portion 10 being annular in shape and extending inward toward the connector body when the connector 1 is assembled and proximate to a portion of the tapered surface 27 of the bearing case 6. Annular cap 8 can be formed of metal or the like and preferably sealably engages with bearing case lip 11 to provide a sealing feature for the EMT conduit. Bearing case lip 11 also acts to provide a seal from the environment, i.e. to secure the electrical metallic tubing against rain, snow, ice, debris, and the like, and damage resulting therefrom if those elements are allowed to enter the connector.

As shown in FIGS. 1-6 and 9 for example, connector body 2 can comprise inlet end 20 (e.g., tubing inlet end) for insertion of electrical metallic tubing 22 and outlet end (e.g., box end) 19 for attachment to an electric box. An attachment device 5 (e.g., a lock nut) can be used to attach connector 1 to an electrical box (not shown). For example, outlet end 19 of connector body 2 can comprise a threaded portion 3, which can engage attachment device 5 and can allow connector body 2 to attach to and remain attached to the electrical box. Attachment device 5 can, optionally, comprise outer teeth 16 that can engage a wall of the electric box to provide a secure connection between connector 1 and the electric box and/or inner teeth 15 that can engage sealing gland 4 to further provide a secure connection between the connector and the electric box. Attachment device 5 can also optionally include protrusions 17 for easy handling of attachment device 5. Threaded portion 3 proximate to outlet end 19 can allow attachment device 5 to be inserted thereon after inserting connector body 2 into the electrical box. Attachment device 5 can be rotated on the threaded portion 3 of connector body 2 to secure connector 1 to the electrical box. Circumscribing the connector body 2 exteriorly thereof at the outlet end 19 can be a radially outwardly extending sealing gland 4, which can function as a stop to effectively limit the distance the connector body 2 can be inserted through a knockout hole of an electrical box or panel.

Figure 6:
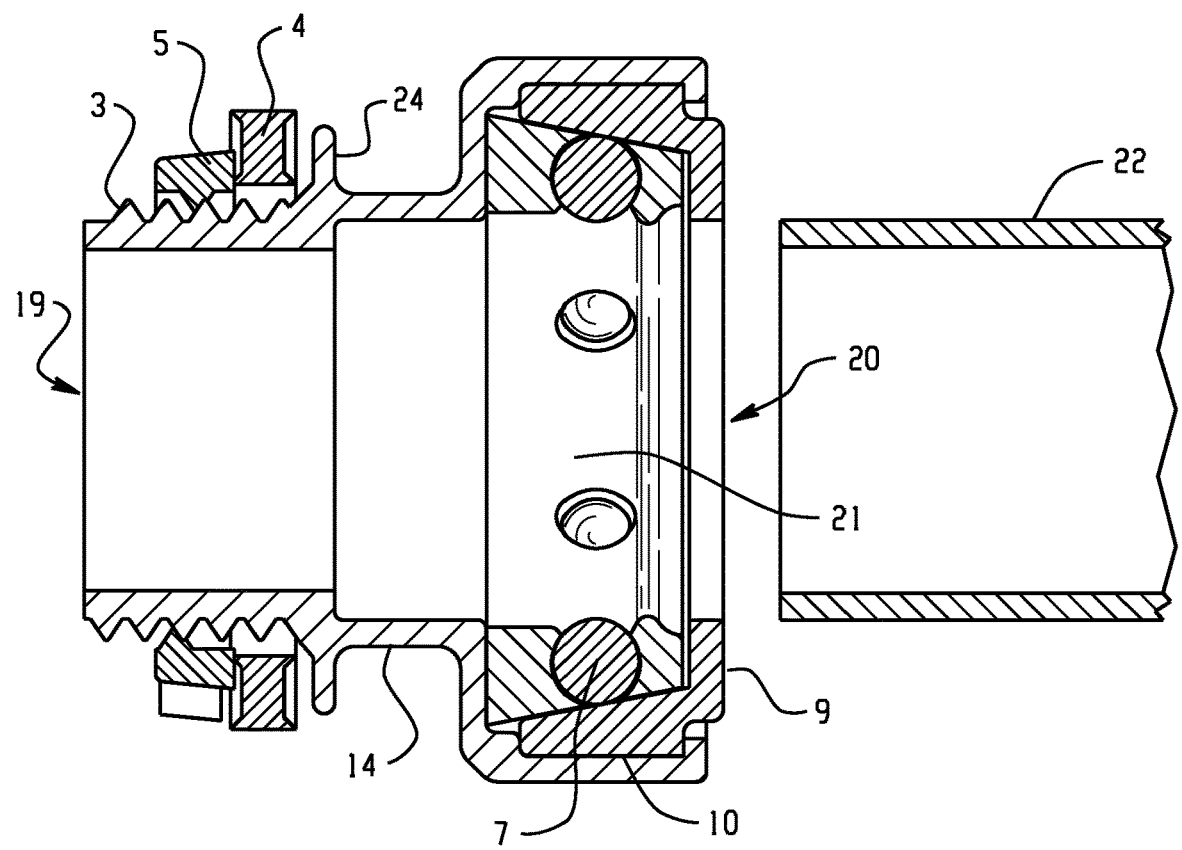
FIG. 6 illustrates a side view of the assembled connector of FIG. 1.
Figure 7:
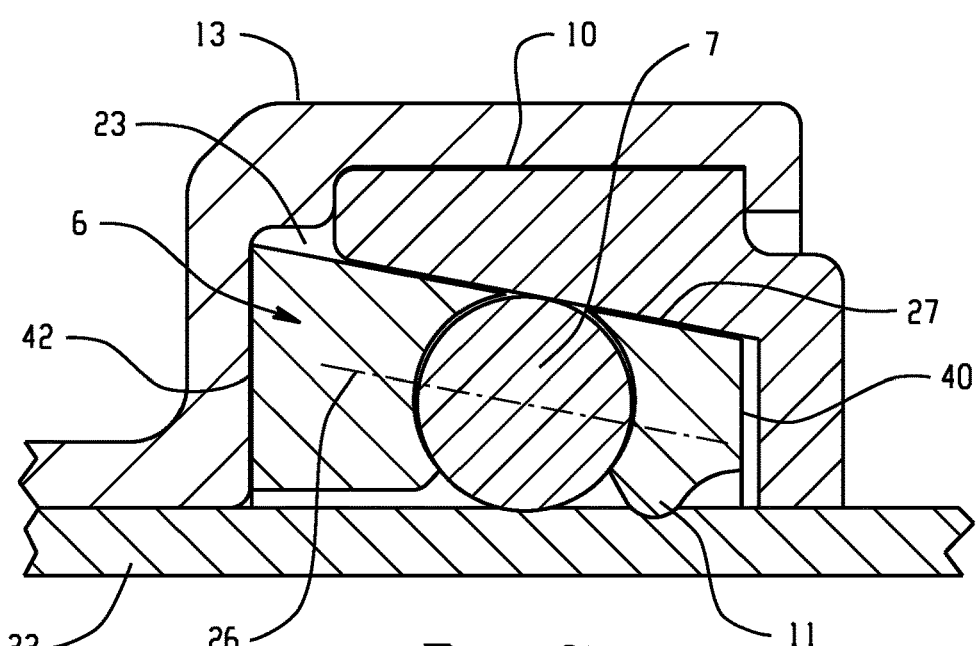
FIG. 7 is a view of a locking device used in a connector containing electrical metal tubing inserted therein.
Figure 8:
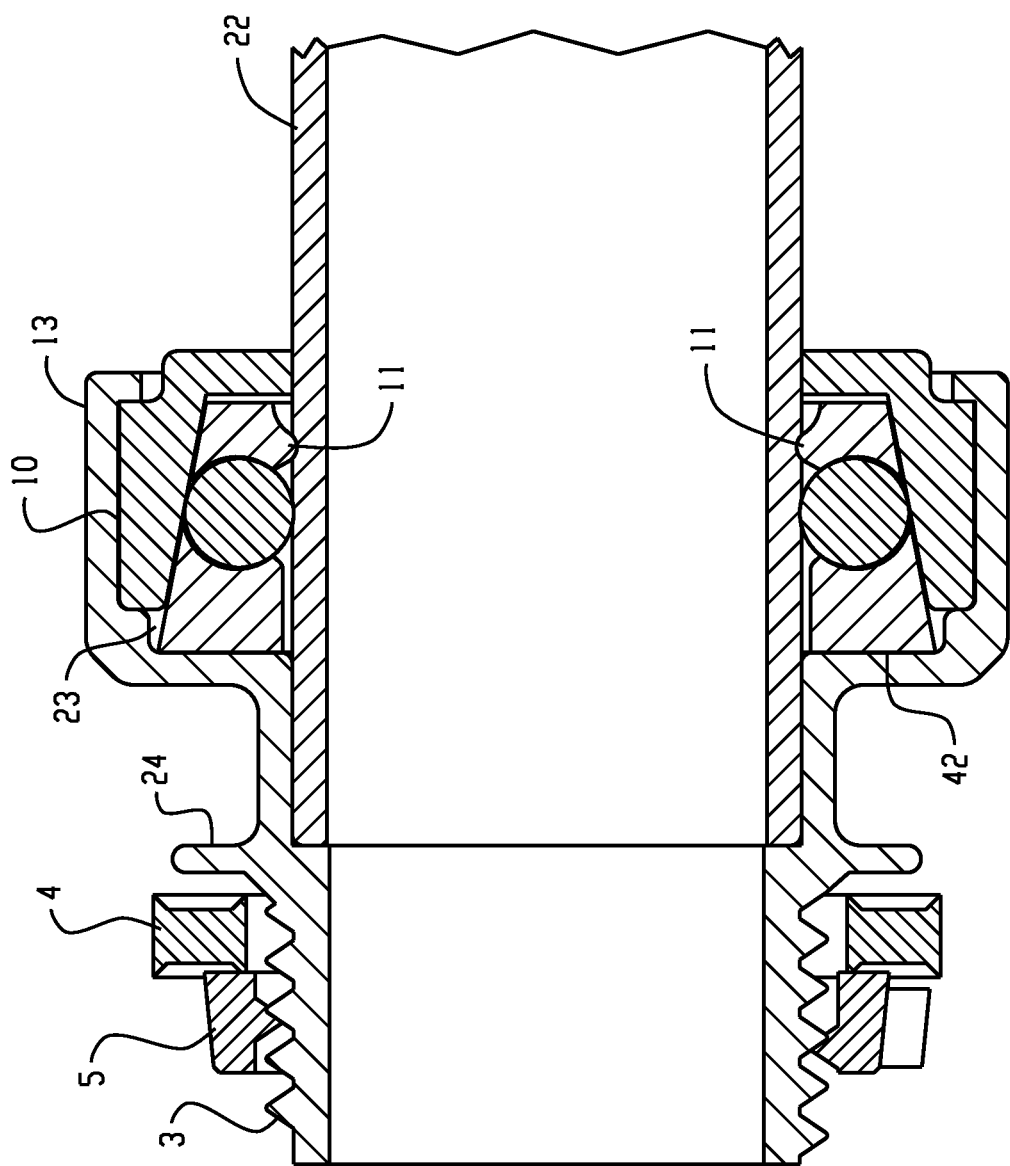
FIG. 8 is another view of the locking device of FIG. 7.
Figure 9:
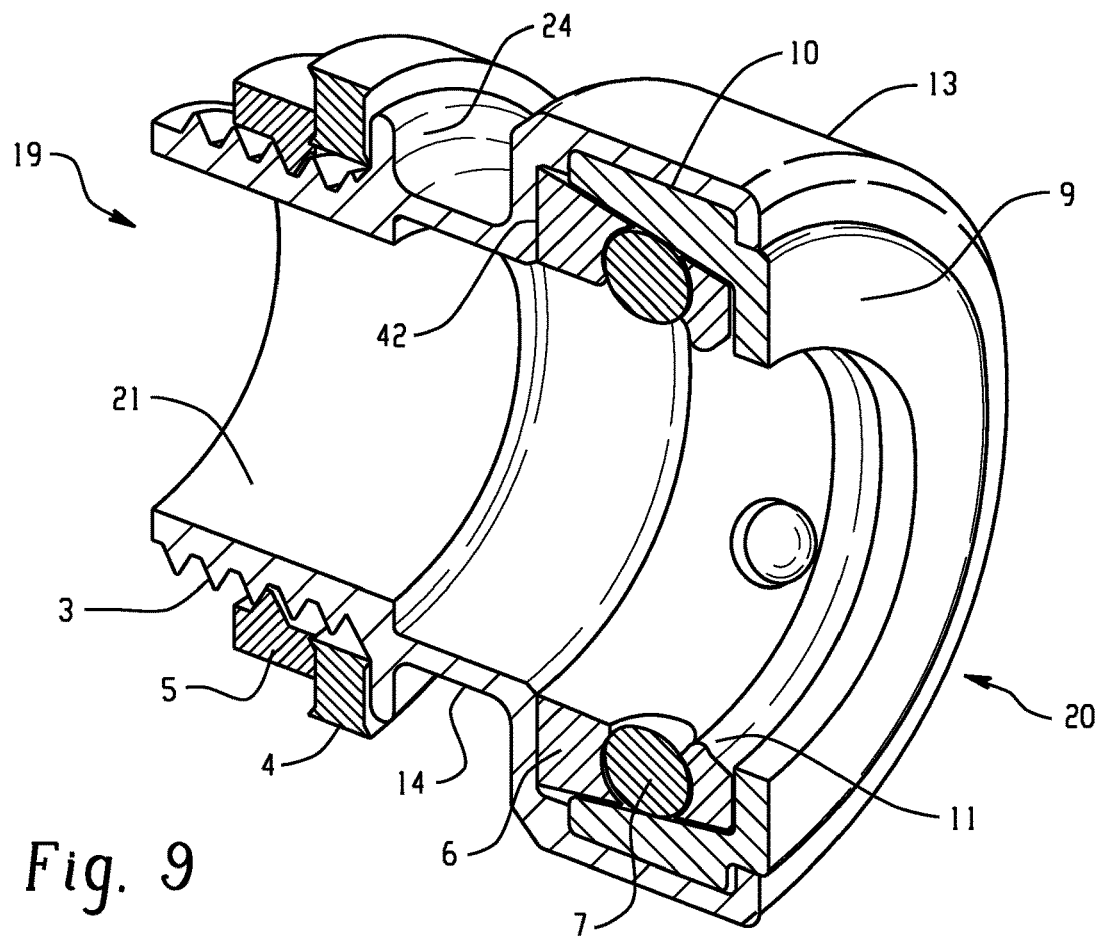
FIG. 9 is a cross-sectional view of the assembled connector of FIG. 1.

Referring now to FIGS. 6-8, in operation, tubing 22 can be inserted into inlet end 20 past leading end portion 13 and into connector body 14 until it reaches shoulder 24. Upon insertion into connector body 14, bearing case lip 11, which is preferably an integral portion of bearing case 6, preferably has an inner diameter less than the outer diameter of tubing 22. Given that lip 11 is compressible (e.g. formed of rubber or a rubber-like material), lip 11 will engage or cling onto the outer surface of tubing 22 (e.g., EMT) resulting in a sealing and and/or retaining feature. The plurality of steel ball locking elements can roll along axis 26 in tapered surface 27 of bearing case 6 and exert an inward force on tubing 22, thereby engaging and securing tubing 22 in place in connector 1. Connector body 14 containing tubing 22 can then be installed by insertion into a junction box, for example, by means of attachment device 5 (e.g. locknut) and optionally sealing gland 4. It will be appreciated that the order of assembly is not critical. Thus, for example, connector 1 could first be inserted and installed into a box (i.e., junction box) by means of attachment device 5 (e.g. locknut) and optionally sealing gland 4 and then tubing 22 could be installed and secured in connector 1 as described above.

In other aspects, the connectors described herein can be configured as a dual-sided connector (often referred to as a "coupling"). More specifically, the connector body can alternatively comprise a dual-sided tubing connector such that the connector acts to connect two different conduits or pieces of tubing (such as electrical metal tubing or EMT) to one another. For example, a dual-sided electrical metallic tubing connector can couple two pieces of electrical metallic tubing together by including a tubing inlet end on both ends of the connector. Such aspects are illustrated for example in FIGS. 12-21.

Figure 16:
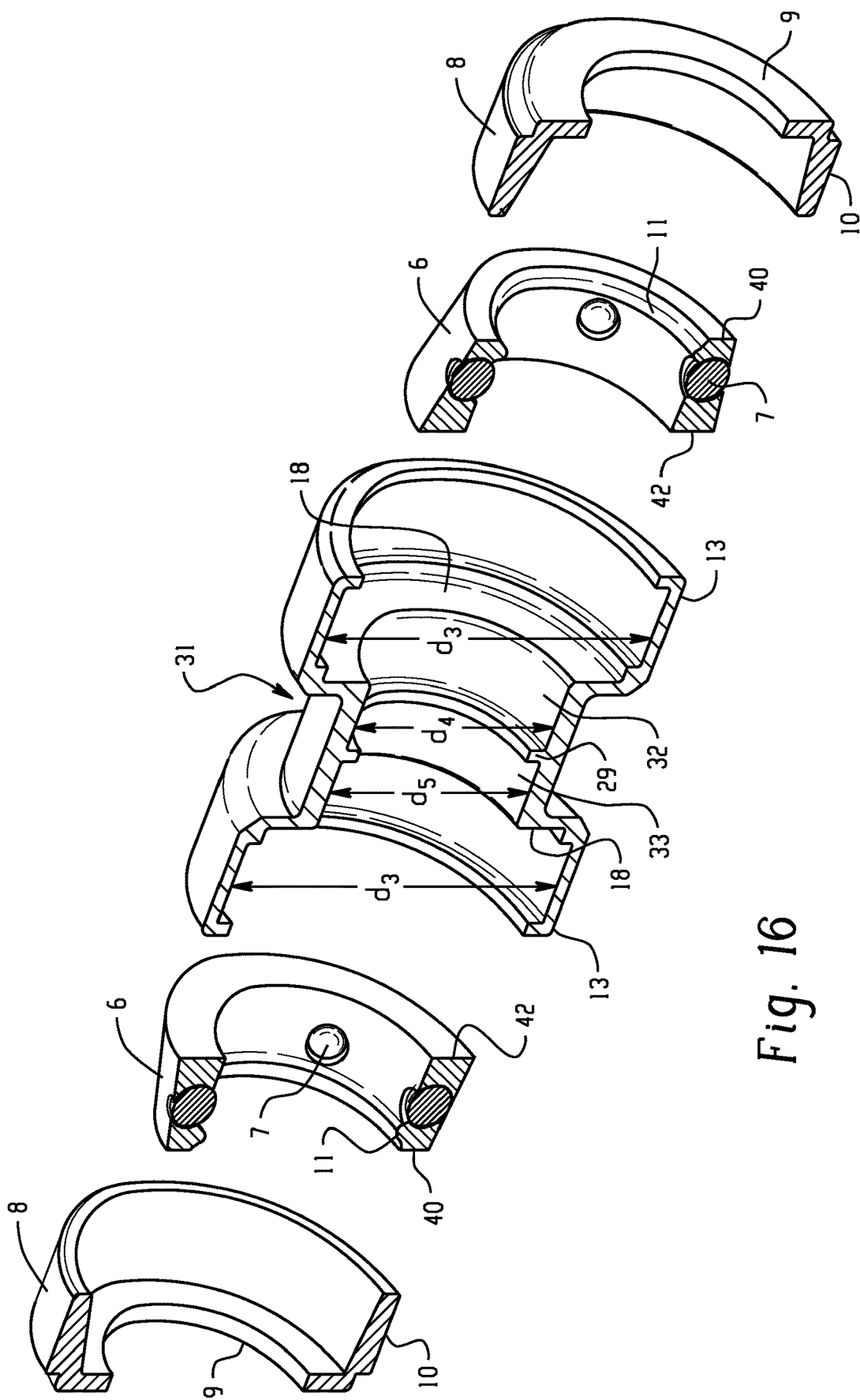
FIG. 16 illustrates an exploded cross-sectional view of the dual-sided connector of FIG. 15.
Figure 17:
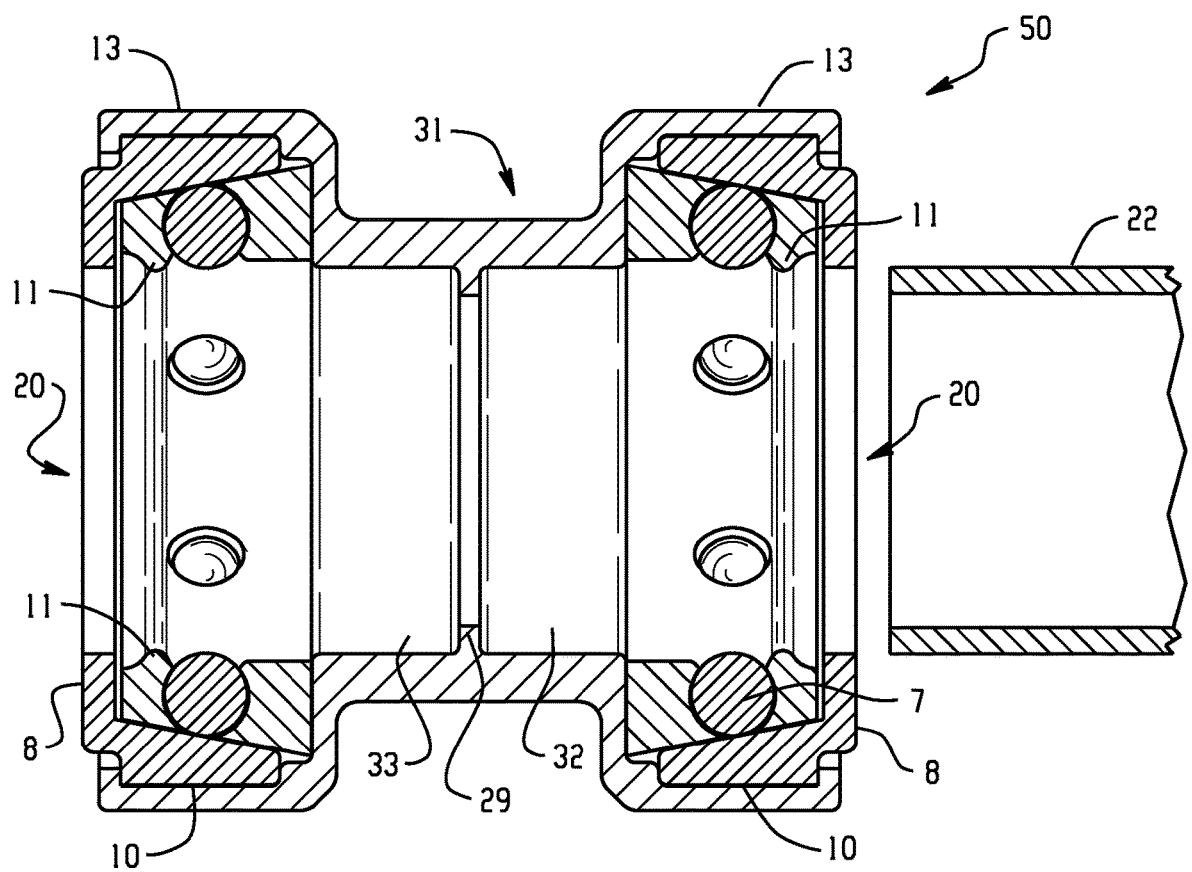
FIG. 17 is an illustration of a dual-sided connector positioned to receive a tubing or conduit.
Figure 18:
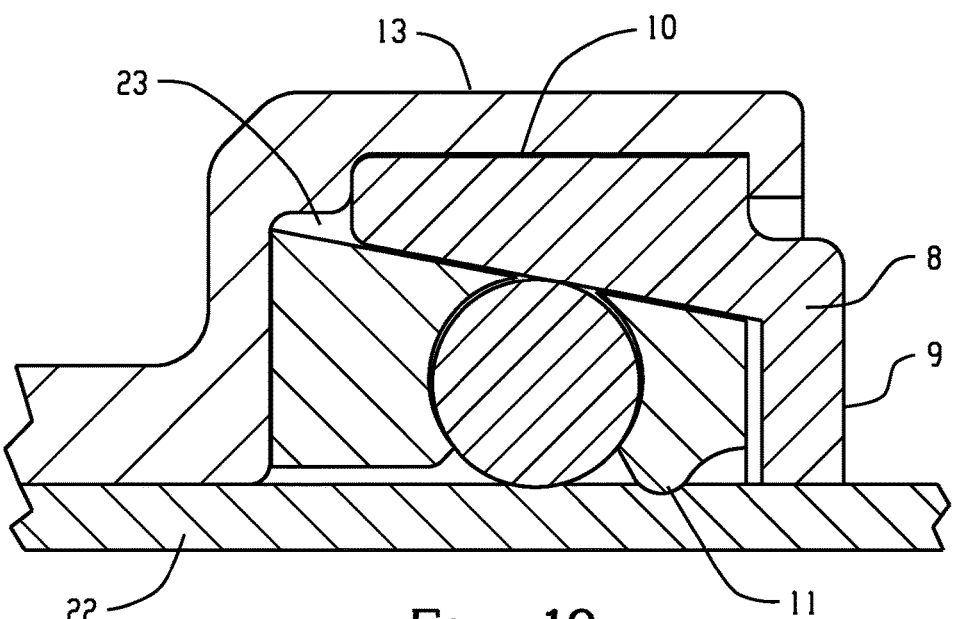
FIG. 18 is a cross-sectional illustration of a locking device of a dual-sided connector.
Figure 19:
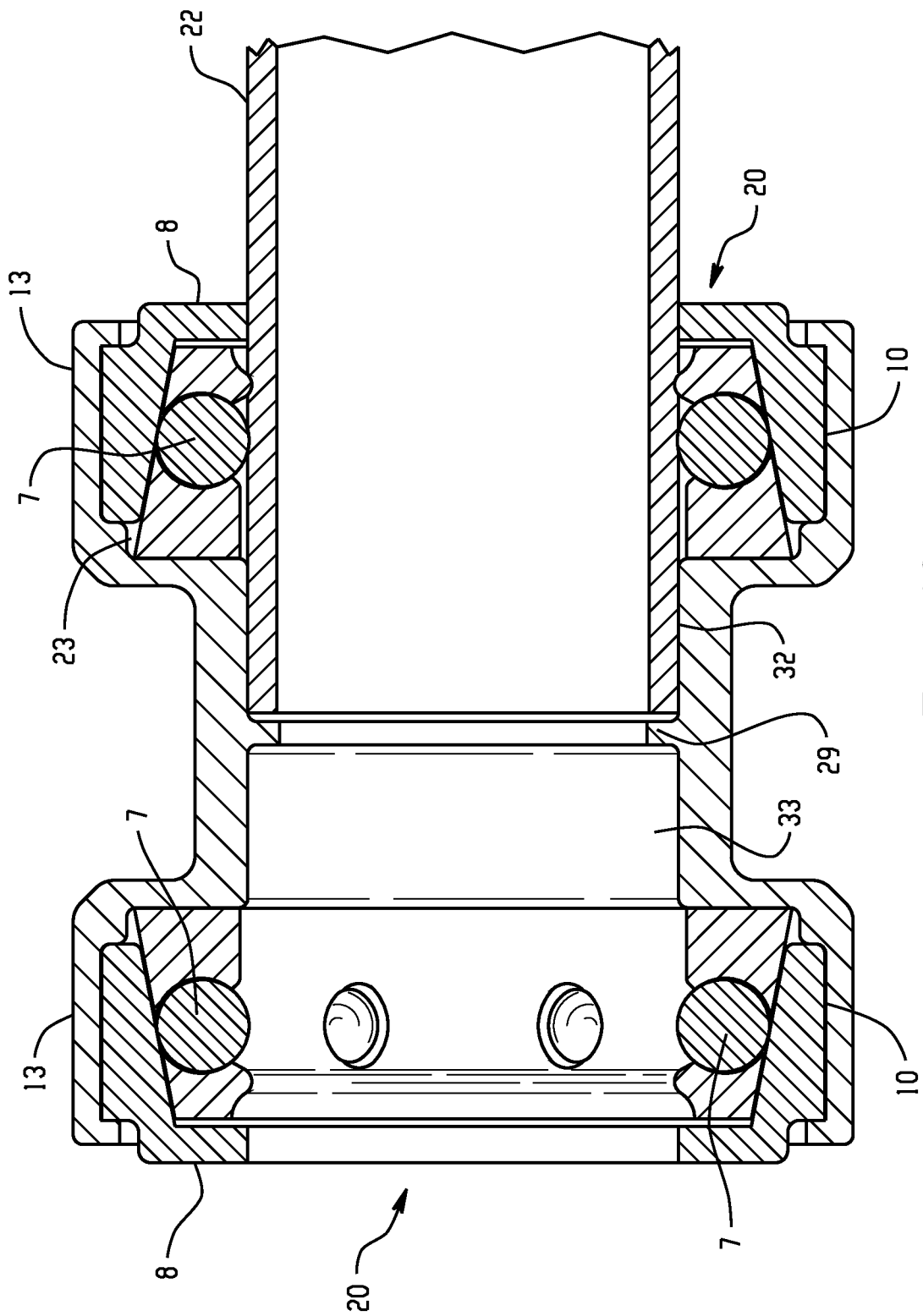
FIG. 19 illustrates a dual-sided connector having tubing (electrical metal tubing or EMT) inserted in one end thereof.
Figure 20:
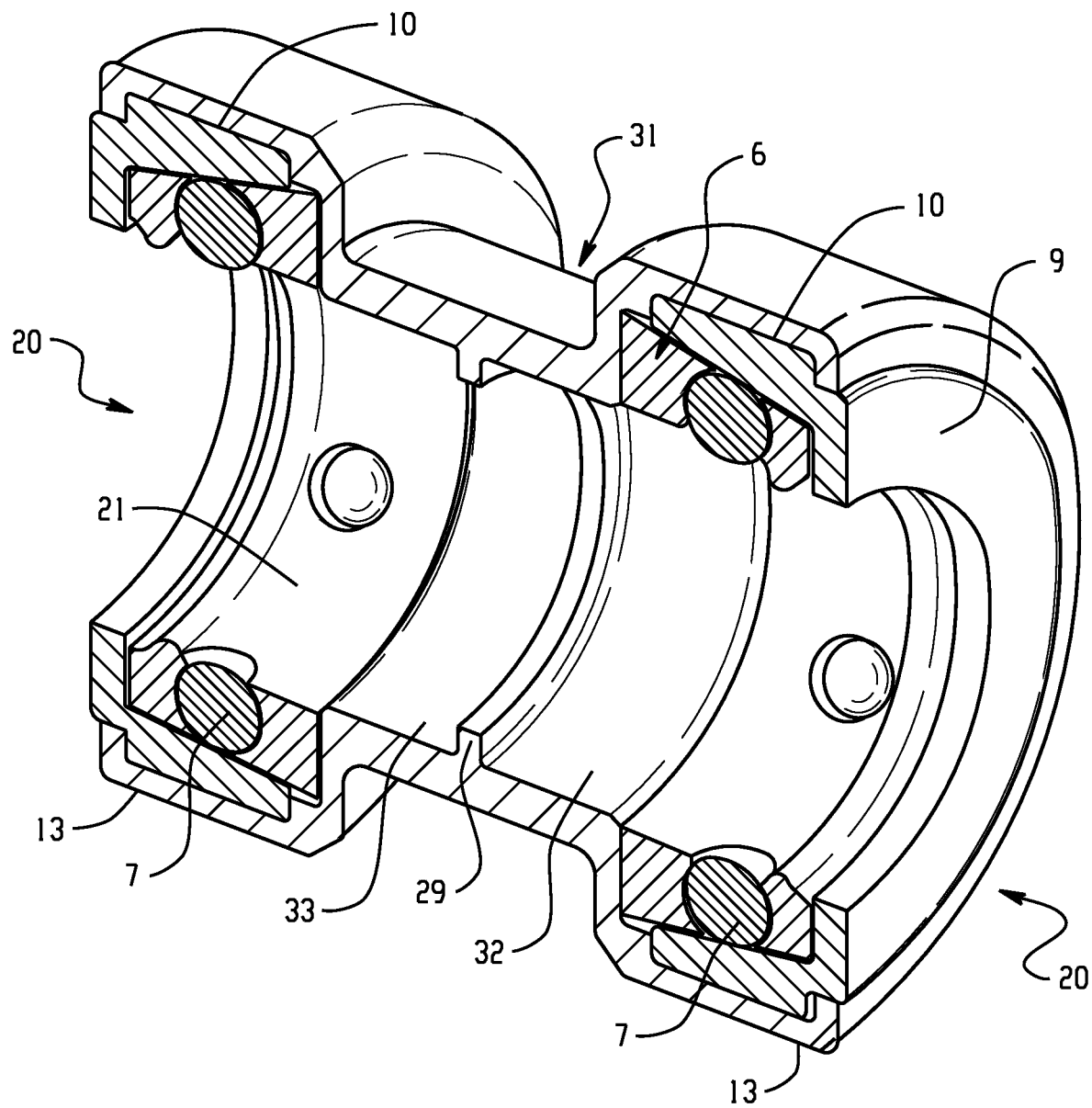
FIG. 20 is a cross-sectional area view of the assembled dual-sided connector of FIG. 12.

As can be seen from FIGS. 12-21, dual-sided connector 50 can include connector body 31 having first side 32 (i.e. first dual connector body portion) and second side 33 (i.e. second dual connector body portion). Dual-sided connector 50 can connect two different conduits or two pieces of electrical metallic tubing to one another. As seen in FIG. 16, first side 32 of connector body 31 can have a diameter $d_4$ and second side 33 of connector body 31 can have a diameter $d_5$. The diameters $d_4$ and $d_5$ can be different but can also be of equal diameters depending upon the tubings to be used. Bore 21 can extend through connector body 31 between inlet end 20 of first side 32 and inlet end 20 of second side 33. As further shown in FIG. 16, $d_4$ and $d_5$ can be generally of a smaller diameter than $d_3$. The difference in size of $d_4$ and $d_5$ relative to $d_3$ can be configured such that when bearing case 6 is inserted into connector body 31, each second end portion 42 of each bearing case 6 can engage each respective inner shoulder 18 of leading end portion 13 so as to form a diameter that is similar or substantially uniform in each connector body side 32 and 33 as seen in FIG. 20. More particularly, when connector 50 is assembled with bearing device 6, a substantially flush or straight portion is formed in bore 21 as can be seen for example in FIG. 20. As mentioned above, the diameters of $d_4$ and $d_5$ may not be equal and provision can be made to adjust the size of the end portion 42 of bearing case 6 as desired for each connector body portion side 32 and 33. Connector body 31 can further include inner shoulder 29. Inner shoulder 29 can function to stop or limit the tubing 22 that is inserted into either inlet 20 as can be seen for example with one piece of tubing in FIG. 20. Similar stopping action could occur if tubing 22 is also inserted in inlet end 20 of connector body portion 33.

Figure 21:
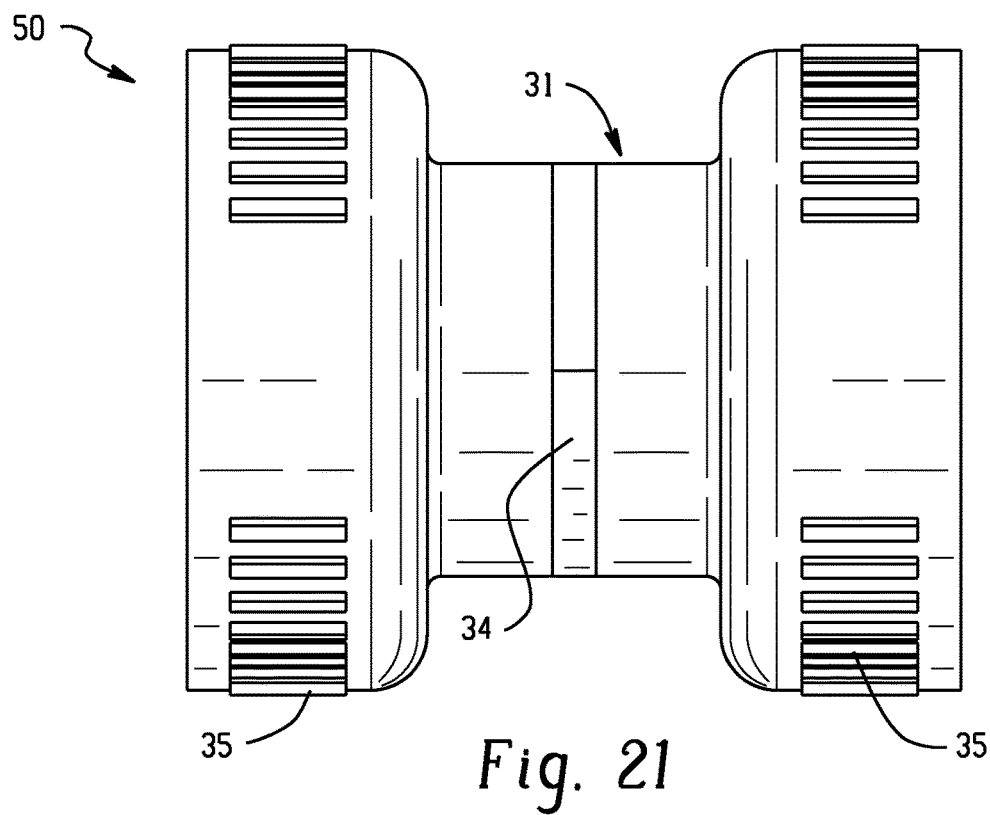
FIG. 21 is another illustration of a dual-sided connector.

In some aspects, dual-sided connector 50 can optionally include outward protrusion(s) 30 on an outer surface of dual-sided connector body 31. Protrusion(s) 30 can allow for easy handling of connector 50 and/or additional strength for connector 50. In addition or alternatively, one or more flange(s) 34 can be provided around the connector body main portion 31 as shown for example in FIG. 21. Such flange(s) can for example be round and/or hexagonal in shape. In addition and as also illustrated in FIG. 21, serrations 35 can be provided on one or both leading end portion(s) 13 of connector 50. Serrations 35 can be provided for gripping purposes during conduit assembly and/or disassembly. It will be appreciated that flange(s) 34 and/or serration(s) 35 can also be included on the connectors illustrated for example in FIGS. 1-11.

In operation, different pieces of tubing 22 (which can for example comprise electrical metal tubing or EMT) can be inserted into dual-sided connector 50 in a manner similar to that discussed above with regard to insertion of tubing 22 in connector 1 (FIGS. 1-11). Accordingly, different pieces of tubing 22 can be inserted into both tubing inlet ends 20 of connector body main portions 32 and 33, and the tubings can be engaged and secured in place as described hereinabove with reference to FIGS. 1-11. In this manner, the pieces of tubing 22 (such as electrical metallic tubing or EMT) can be joined together in connector 50 and held securely in place inside connector body 31.

A conduit or tubing such as electrical metallic tubing can be inserted and removed into either end of the dual-sided connector 50 in the same manner as described above for connector 1 in FIGS. 1 to 11.

It is noted that the connector piece as herein described can be used to connect electrical metallic tubing of various sizes, including but not limited to ½ inch (12.7 millimeters (mm)), ¾ inch (19.1 mm), 1 inch (25.4 mm), etc. It is further contemplated that the connectors described herein can also be used to connect non-electrical tubes, such as plastic tubes and the like. It is also noted that while reference is made to connectors that can connect one or two conduits or electrical metallic tubings, embodiments wherein three or more conduits or tubes can be connected are also envisioned.

In addition to various sizes of electrical metal tubings and tubing materials herein described, it is also contemplated that the connectors can be used in conjunction with other metal tubings. For example, other metal tubings such as intermediate metallic conduits (IMC) and rigid conduits typically have both ends threaded. When it is necessary to cut such tubings in the field or in practice for instance, the end(s) thereof may no longer be threaded. The connectors described herein can accordingly be used in such instances where one or both ends of the tubing are no longer threaded.

Set forth below are some embodiments of connectors and methods of making connectors as disclosed herein.

Embodiment 1

A connector, comprising: a connector body comprising an inlet end and an outlet end with a bore extending therethrough, the connector body further comprising a leading end portion positioned at the inlet end and a threaded portion at the outlet end of the connector body and a connector main body portion positioned between the leading end portion and the threaded portion; a generally annular bearing case having a tapered surface positioned in the leading end portion of the connector body, the bearing case formed with at least one recess and includes a bearing case axis; and at least one locking element positioned in the at least one recess of the bearing case and movable along the bearing case axis.

Embodiment 2

The connector of Embodiment 1, wherein the bearing case is formed with multiple recesses circumscribing the bearing case and wherein multiple locking elements are positioned in the recesses of the bearing case and movable along the bearing case axis.

Embodiment 3

The connector of Embodiment 1 or Embodiment 2, wherein the at least one locking element comprises at least one ball.

Embodiment 4

The connector of any of Embodiments 1 to 3, further comprising an annular cap positioned proximate to the inlet end of the leading edge portion of the connector body, wherein the annular cap comprises a raised portion and a recessed portion, the recessed portion being annular in shape and extending inward toward the connector body and proximate to a portion of the tapered surface of the bearing case.

Embodiment 5

The connector of any of Embodiments 1 to 4, wherein the bearing case is formed from a compressible material.

Embodiment 6

The connector of Embodiment 5, wherein the compressible material comprises a plastic material.

Embodiment 7

The connector of any of Embodiment 1 to 6, further comprising an attachment device circumscribing the threaded portion and a sealing gland secured on the threaded portion of the connector body by the attachment device.

Embodiment 8

The connector of any of Embodiments 1 to 7, wherein the connector body further comprises an inner shoulder proximate to the threaded portion and the connector body portion.

Embodiment 9

The connector of Embodiment 8, wherein the inner shoulder limits a length that tubing can be inserted into the bore of the connector body.

Embodiment 10

The connector of any of Embodiments 1 to 9, wherein the multiple of ball locking elements engage and secure tubing inserted into the bore of the connector body.

Embodiment 11

The connector of Embodiment 10, wherein the tubing comprises electrical metal tubing (EMT).

Embodiment 12

A dual-sided connector, comprising: a connector body comprising a first dual connector body portion having a first inlet end and a first leading edge portion and a second dual connector body portion having a second inlet end and a second leading edge portion, wherein the connector body further comprises a bore extending therethrough; a first generally annular bearing case having a first tapered surface positioned in the first leading end portion of the connector body, the first bearing case formed with at least one recess and includes a first bearing case axis; a second generally annular bearing case having a second tapered surface positioned in the second leading end portion of the connector body, the second bearing case formed with at least one recess and includes a second bearing case axis; at least one first locking element positioned in the at least one recess of the first bearing case and movable along the first bearing case axis; and at least one second locking element positioned in the at least one recess of the second bearing case and movable along the second bearing case axis.

Embodiment 13

The dual-sided connector of Embodiment 12, wherein the first and second bearing cases each are formed with multiple recesses circumscribing the bearing cases and wherein multiple locking elements are positioned in each of the recesses of the first and second bearing cases and movable along the respective bearing case axes.

Embodiment 14

The dual-sided connector of Embodiment 12 or Embodiment 13, wherein the at least one locking element comprises at least one ball.

Embodiment 15

The dual-sided connector of any of Embodiments 12 to 14, further comprising a first annular cap positioned proximate to the inlet end of the first leading edge portion of the connector body, wherein the annular cap comprises a first raised portion and a first recessed portion, the first recessed portion being annular in shape and extending inward toward the connector body and proximate to a portion of the first tapered surface of the first bearing case; and a second annular cap positioned proximate to the inlet end of the second leading edge portion of the connector body, wherein the annular cap comprises a second raised portion and a second recessed portion, the second recessed portion being annular in shape and extending inward toward the connector body and proximate to a portion of the second tapered surface of the second bearing case.

Embodiment 16

The dual-sided connector of any of Embodiments 12 to 15, wherein the first and second bearing cases are formed from a compressible material.

Embodiment 17

The dual-sided connector of Embodiment 16, wherein the compressible material comprises a plastic material.

Embodiment 18

The dual-sided connector of any of Embodiments 12 to 17, wherein the connector body further comprises an inner shoulder positioned between the first dual connector body portion and the second dual connector body portion.

Embodiment 19

The dual-sided connector of Embodiment 18, wherein the inner shoulder limits a length that a tubing can be inserted into at least one of the first inlet end and the second inlet end of the connector body.

Embodiment 20

The dual-sided connector of Embodiment 19, wherein the inner shoulder limits the length that tubing can be inserted into both the first and the second inlet ends of the connector body.

Embodiment 21

The dual-sided connector of any of Embodiments 12 to 20, wherein the at least one first locking element engages and secures a first tubing inserted into the first inlet end of the first leading edge portion and wherein the at least one second locking element engages and secures a second tubing inserted into the second inlet end of the second leading edge portion.

Embodiment 22

The dual-sided connector of Embodiment 21, wherein the first and second tubing comprises electrical metal tubing (EMT).

Embodiment 23

A method of making a connector, comprising: forming a connector body comprising an inlet end and an outlet end with a bore extending therethrough, the connector body further comprising a leading end portion positioned at the inlet end and a threaded portion at the outlet end of the connector body and a connector main body portion positioned between the leading end portion and the threaded portion; providing a generally annular bearing case having a tapered surface and formed with at least one recess formed therein and includes an bearing case axis; inserting at least one locking element in the at least one recess of the bearing case and movable along the bearing case axis; and inserting the generally annular bearing case having a tapered surface into the leading end portion of the connector body.

Embodiment 24

The method of Embodiment 23, wherein the bearing case is formed with multiple recesses circumscribing the bearing case and wherein multiple locking elements are positioned in the recesses of the bearing case and movable along the bearing case axis.

Embodiment 25

The method of Embodiment 23 or Embodiment 24, wherein the at least one locking element comprises at least one ball.

Embodiment 26

The method of any of Embodiments 23 to 25, further comprising positioning an annular cap positioned proximate to the inlet end of the leading edge portion of the connector body, wherein the annular cap comprises a raised portion and a recessed portion, the recessed portion being annular in shape and extends inward toward the connector body and proximate to a portion of the tapered surface of the bearing case.

Embodiment 27

The method of any of Embodiments 23 to 26, wherein the bearing case is formed from a compressible material.

Embodiment 28

The method of Embodiment 27, wherein the compressible member comprises a plastic material.

Embodiment 29

The method of any of Embodiments 23 to 28, further comprising inserting tubing into the inlet end of the connector body such that the at least one locking element engages and secures the tubing in the connector body.

Embodiment 30

The method of Embodiment 29, wherein the tubing is electrical metal tubing (EMT).

The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements can be combined in any suitable manner in the various embodiments.

While particular embodiments have been described, alternatives, modifications, variations, improvements, and substantial equivalents that are or may be presently unforeseen may arise to Applicants or others skilled in the art. Accordingly, the appended claims as filed and as they may be amended are intended to embrace all such alternatives, modifications variations, improvements, and substantial equivalents.

What is claimed is:

1. A connector, comprising: a connector body comprising an inlet end and an outlet end with a bore extending therethrough, the connector body further comprising a leading end portion positioned at the inlet end and a threaded portion at the outlet end of the connector body and a connector main body portion positioned between the leading end portion and the threaded portion; a generally annular bearing case having a tapered outer surface and an inwardly annular protruding lip positioned in the leading end portion of the connector body, the bearing case formed with at least one recess and includes a bearing case axis; and at least one locking element positioned in the at least one recess of the bearing case and movable along the bearing case axis; and an attachment device circumscribing the threaded portion and a sealing gland secured on the threaded portion of the connector body by the attachment device, an annular cap positioned proximate to the inlet end of the leading edge portion of the connector body, wherein the annular cap comprises a raised portion and a recessed portion, the recessed portion being annular in shape and extending from the raised portion toward the outlet end of the connector body and proximate to a portion of the tapered surface of the bearing case; and wherein the bearing case has a first end portion near the inlet end, and a second end portion between the first end portion and the outlet end, and wherein the tapered surface is between the first end portion and the second end portion, the annular cap has an inner tapered surface which inner tapered surface corresponds to the tapered surface of the bearing case and both the bearing case's tapered surface and the annular cap's tapered surface abut each other and both tapered surfaces are entirely contained within a recess of the connector body.

2. The connector of claim 1, wherein the bearing case is formed with multiple recesses circumscribing the bearing case and wherein multiple locking elements are positioned in the recesses of the bearing case and movable along the bearing case axis.

3. The connector of claim 1, wherein the at least one locking element comprises at least one ball.

4. The connector of claim 1, wherein the bearing case is formed from a compressible material.

5. The connector of claim 1, wherein the connector body further comprises an inner shoulder proximate to the threaded portion and the connector body portion.

6. The connector of claim 5, wherein the inner shoulder limits a length that tubing can be inserted into the bore of the connector body.

7. The connector of claim 1, wherein the multiple of ball locking elements engage and secure tubing inserted into the bore of the connector body.

8. The connector of claim 1, wherein the threaded portion has an inner diameter, $d_1$, the connector main body portion has an inner diameter, $d_2$, and the leading end portion has an inner diameter, $d_3$, wherein $d_1$ is smaller than $d_2$ and $d_2$ is smaller than $d_3$.

9. The connector of claim 1, wherein at least a portion of the recessed portion is located between the leading end portion and the tapered surface of the bearing case.

* * * * *